United States Patent
Khouw et al.

(10) Patent No.: US 10,724,213 B2
(45) Date of Patent: Jul. 28, 2020

(54) MIST COLLECTION ARRANGEMENT

(71) Applicant: Honda Motor Co., Ltd., Tokyo (JP)

(72) Inventors: Raymond L. Khouw, Dublin, OH (US); Thanish R. Boggula, Dublin, OH (US); Aryaman Dashora, Plain City, OH (US); Yash Gaddam, Dublin, OH (US); Akaash Ganga, Plain City, OH (US); Shawn W. Hu, Dublin, OH (US); Pranav Kakarla, Plain City, OH (US); Davyn L. Khouw, Dublin, OH (US); Sara A. Khouw, Dublin, OH (US); Akul Singh, Plain City, OH (US)

(73) Assignee: Honda Motor Co., Ltd., Tokyo (JP)

(*) Notice: Subject to any disclaimer, the term of this patent is extended or adjusted under 35 U.S.C. 154(b) by 72 days.

(21) Appl. No.: 16/222,029

(22) Filed: Dec. 17, 2018

(65) Prior Publication Data

US 2020/0095753 A1 Mar. 26, 2020

Related U.S. Application Data

(60) Provisional application No. 62/735,750, filed on Sep. 24, 2018.

(51) Int. Cl.
*B01D 45/02* (2006.01)
*E03B 3/28* (2006.01)

(52) U.S. Cl.
CPC ............... *E03B 3/28* (2013.01); *B01D 45/02* (2013.01)

(58) Field of Classification Search
CPC ......... E03B 3/28; B01D 45/02; B01D 5/0015; B01D 5/009; C02F 1/14; C02F 1/18
See application file for complete search history.

(56) References Cited

U.S. PATENT DOCUMENTS

| 2,761,292 A | 9/1956 | Coanda et al. |
| 5,275,643 A | 1/1994 | Usui |
| 6,869,464 B2 | 3/2005 | Klemic |

(Continued)

FOREIGN PATENT DOCUMENTS

| CA | 2361689 A | 4/2003 |
| CN | 1538011 A | 10/2004 |

(Continued)

*Primary Examiner* — Jonathan Miller
(74) *Attorney, Agent, or Firm* — Honda Patents & Technologies North America, LLC; Wesly Alig

(57) ABSTRACT

A three-tiered funneling type mist collection arrangement for collecting water from mist in air flowing therethrough is disclosed. The mist collection arrangement includes support frame, first funnel disk, second funnel disk, third funnel disk, and mesh member. First funnel disk, second funnel disk, and third funnel disk are mounted on the support frame while being coaxially aligned, such that a first drip cavity, a second drip cavity, and a third drip cavity is coaxially aligned with each other. The second funnel disk has a lesser diameter than the first funnel disk. The mesh member is attached to and extends between a first periphery of the first funnel disk and a second periphery of the second funnel disk, to form a frustoconical structure. Water in mist of surrounding air is collected on the mesh member, which is trickled to the first funnel disk and later to the third funnel disk.

16 Claims, 6 Drawing Sheets

(56) References Cited

U.S. PATENT DOCUMENTS

| | | | | |
|---|---|---|---|---|
| 7,467,523 B2* | 12/2008 | Vetrovec | ............... | B01D 5/0066 |
| | | | | 62/272 |
| 7,866,176 B2* | 1/2011 | Vetrovec | ............... | B01D 5/0066 |
| | | | | 62/235.1 |
| 8,357,231 B2* | 1/2013 | Hoff | .................. | A01G 13/0243 |
| | | | | 95/267 |
| 9,151,020 B2* | 10/2015 | Thielow | ............... | B01D 53/185 |
| 9,200,434 B2 | 12/2015 | Lehky | | |
| 9,227,149 B2* | 1/2016 | Boudeman | ................ | E03B 3/28 |
| 9,587,381 B2* | 3/2017 | Turner, Jr. | ........... | B01D 5/0015 |
| 2006/0032493 A1* | 2/2006 | Ritchey | ..................... | C02F 1/14 |
| | | | | 126/684 |
| 2014/0083120 A1* | 3/2014 | Nowak | ..................... | E03B 3/28 |
| | | | | 62/93 |

FOREIGN PATENT DOCUMENTS

| | | | |
|---|---|---|---|
| CN | 1693597 | A | 11/2005 |
| CN | 2799681 | Y | 7/2006 |
| CN | 1880531 | A | 12/2006 |
| CN | 202248054 | U | 5/2012 |
| CN | 204202921 | U | 3/2015 |
| CN | 104472324 | A | 4/2015 |
| CN | 204418276 | U | 6/2015 |
| CN | 104904564 | A | 9/2015 |
| CN | 204645147 | U | 9/2015 |
| CN | 205400243 | U | 7/2016 |
| CN | 205530452 | U | 8/2016 |
| CN | 205530459 | U | 8/2016 |
| CN | 205794383 | U | 12/2016 |
| CN | 106320436 | A | 1/2017 |
| CN | 106320440 | A | 1/2017 |
| CN | 106320441 | A | 1/2017 |
| CN | 106320445 | A | 1/2017 |
| CN | 107034950 | A | 8/2017 |
| CN | 206503181 | U | 9/2017 |
| CN | 207362922 | U | 5/2018 |
| CN | 207392597 | U | 5/2018 |
| DE | 3543489 | A1 | 6/1987 |
| DE | 10309110 | A1 | 9/2004 |
| DE | 102004021166 | A1 | 11/2005 |
| DE | 102012107638 | A1 | 2/2014 |
| DE | 202014105100 | U1 | 12/2014 |
| EA | 201300086 | A1 | 12/2013 |
| JP | H10192839 | A | 7/1998 |
| JP | 2004316398 | A | 11/2004 |
| KR | 200301721 | Y1 | 1/2003 |
| KR | 101304336 | A | 3/2013 |
| KR | 101369389 | B1 | 3/2014 |
| KR | 20140099779 | A | 8/2014 |
| KR | 20180017625 | A | 2/2018 |
| RU | 2190448 | C2 | 10/2002 |
| RU | 131751 | U1 | 8/2013 |
| WO | 9004456 | A1 | 5/1990 |
| WO | 0240125 | A2 | 5/2002 |
| WO | 2015149816 | A1 | 10/2015 |
| WO | 2016062877 | A1 | 4/2016 |

\* cited by examiner

MIST COLLECTION ARRANGEMENT

CROSS-REFERENCE TO RELATED APPLICATION

The present application claims priority to U.S. Provisional Patent Application Ser. No. 62/735,750 filed Sep. 24, 2018, which is incorporated herein by reference.

TECHNICAL FIELD

The present disclosure generally relates to mist collection arrangements. More particularly, the present disclosure relates to a three-tiered funneling type mist collection arrangement for collecting water from mist in air flowing therethrough.

BACKGROUND

Although water covers almost 71 percent of the earth's surface, only three percent of that water is potable. Furthermore, it is estimated that irrigation systems consume approximately 70 percent of the world's freshwater placing an additional burden on fresh water supply. With increasing human population, increased economic activity, and pollution, it is estimated that two of every three people in the world will live in water-stressed conditions by the year 2030. The indispensability of water followed by its impending scarcity creates potential for future regional conflicts. In this context, it is imperative to explore alternative technologies that reduce dependence on fresh water resources.

Drip irrigation systems refer to a type of micro-irrigation system, commonly known in agricultural industry, which supplies water directly to the roots of a plant. In certain areas, scarcity of water has been a concern for such drip irrigation systems. For example, in arid areas, water is not easily available. In order to solve this, a drip irrigation system may employ a mist collection arrangement. The mist collection arrangement collects water from mist in surrounding air, and water thus collected is used by the drip irrigation system for irrigation purposes.

Over the years, several mist collection arrangements have been devised to collect water from mist in surrounding air. However, existing mist collection arrangements suffer from a variety of drawbacks. For instance, one such mist collection arrangement may employ a number of vertical mesh vanes, which are electrically rotated to collect water from mist in air flowing therethrough. The water so collected is further funneled and guided to a storage tank. Such mist collection arrangements would however cause unfiltered water to be trickled to the storage tank. Furthermore, such mist collection arrangement require a continuous supply of electricity for normal operation.

Hence, there is a long felt but unresolved need for a mist collection arrangement, which collects filtered water by collecting mist in surrounding air. Furthermore, there is a need for a mist collection arrangement suitably constructed to avoid spillage of collected water from the mist collection arrangement.

SUMMARY

This summary is provided to introduce a selection of concepts in a simplified form that are further disclosed in the detailed description of the present disclosure. This summary is not intended to identify key or essential inventive concepts of the claimed subject matter, nor is it intended for determining the scope of the claimed subject matter.

A mist collection arrangement, disclosed herein, for collecting water from mist in air flowing therethrough includes a support frame, a first funnel disk, a second funnel disk, a third funnel disk, and a mesh member. The first funnel disk is mounted on the support frame and includes a first periphery and a first drip cavity. The second funnel disk is mounted on the support frame at a relatively greater height than the first funnel disk and coaxially aligned with the first funnel disk. The second funnel disk further includes a second periphery and a second drip cavity. The second funnel disk has a diameter relatively smaller than a diameter of the first funnel disk. The third funnel disk is mounted on the support frame at a lesser height than the first funnel disk and coaxially aligned with the first funnel disk. The third funnel disk includes a third drip cavity. The mesh member is attached to and extends between the first periphery and the second periphery, to form a substantially frustoconical structure. Further, the mist collection arrangement is structured such that water collected on the first funnel disk is trickled to the third drip cavity of the third funnel disk through the first drip cavity and water collected on the second funnel disk is trickled to the third drip cavity of the third funnel disk through the second drip cavity.

In accordance with another embodiment, the mist collection arrangement, disclosed herein, for collecting water from mist in air flowing therethrough includes a support frame, a first funnel disk, a second funnel disk, a cylindrical storage tank, and a mesh member. The first funnel disk is mounted on the support frame and includes a first periphery and a first drip cavity. The second funnel disk is mounted on the support frame at a relatively greater height than the first funnel disk and coaxially aligned with the first funnel disk. The second funnel disk further includes a second periphery and a second drip cavity. The second funnel disk has a diameter relatively smaller than a diameter of the first funnel disk. The cylindrical storage tank is mounted on the support frame at a relatively lesser height than the first funnel disk and coaxially aligned with the first funnel disk. The cylindrical storage tank further includes a top surface and a bottom surface. The top surface is made in form of a third funnel disk and defines an inlet port. The bottom surface defines an outlet port. The mesh member is attached to and extends between the first periphery and the second periphery. The mist collection arrangement is structured such that water collected on the first funnel disk is trickled to the inlet port of the cylindrical storage tank through the first drip cavity, and water collected on the second funnel disk is trickled to the inlet port of the cylindrical storage tank through the second drip cavity.

In accordance with another embodiment, the mist collection arrangement, disclosed herein, for collecting mist from air flowing therethrough includes a support frame, a first funnel disk, a second funnel disk, a cylindrical storage tank, a mesh mounting arrangement, and a mesh member. The first funnel disk is mounted on the support frame and includes a first periphery and a first drip cavity. The second funnel disk is mounted on the support frame at a relatively greater height than the first funnel disk and coaxially aligned with the first funnel disk. The second funnel disk further includes a second periphery and a second drip cavity. The cylindrical storage tank is mounted on the support frame at a relatively lesser height than the first funnel disk and coaxially aligned with the first funnel disk. The cylindrical storage tank includes a top surface and a bottom surface. The top surface is made up of a third funnel disk and defines an inlet port.

The bottom surface defines an outlet port. The mesh mounting arrangement includes a first array of hooks and a second array of hooks. The first array of hooks are arranged along and positioned inside the first periphery of the first funnel disk. The second array of hooks are arranged along and positioned inside the second periphery of the second collection tank. The mesh member is attached to each of the first array of hooks and the second array of hooks, to extend between the first periphery and the second periphery.

BRIEF DESCRIPTION OF THE DRAWINGS:

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION OF THE PREFERRED EMBODIMENT

Typically, mist refers to a phenomenon caused due to small droplets of water suspended in air. On the other hand, when similar droplets of water are suspended over a water body such as a lake, a marsh area or the like and causes reduced visibility, the phenomenon is termed as 'fog'. As used in the present disclosure, 'mist' may be construed to refer to droplets of water suspended in air and any form of precipitation that may be suitably harvested and stored by a mist collection arrangement 100.

The mist collection arrangement 100, disclosed herein, is configured to extract water droplets from surrounding air. The mist collection arrangement 100 is employed to collect mist from air flowing therethrough and water so collected may be used for varied purposes. For example, the mesh collection arrangement 100 may be used with a drip irrigation system to collect water from mist in air flowing therethrough and water so collected is used by the drip irrigation system for irrigation purposes. Alternatively, the mist collection arrangement 100 may be used as a standalone apparatus for collecting water from mist in air flowing therethrough, and water so collected may be used for various other purposes.

Figure 1:
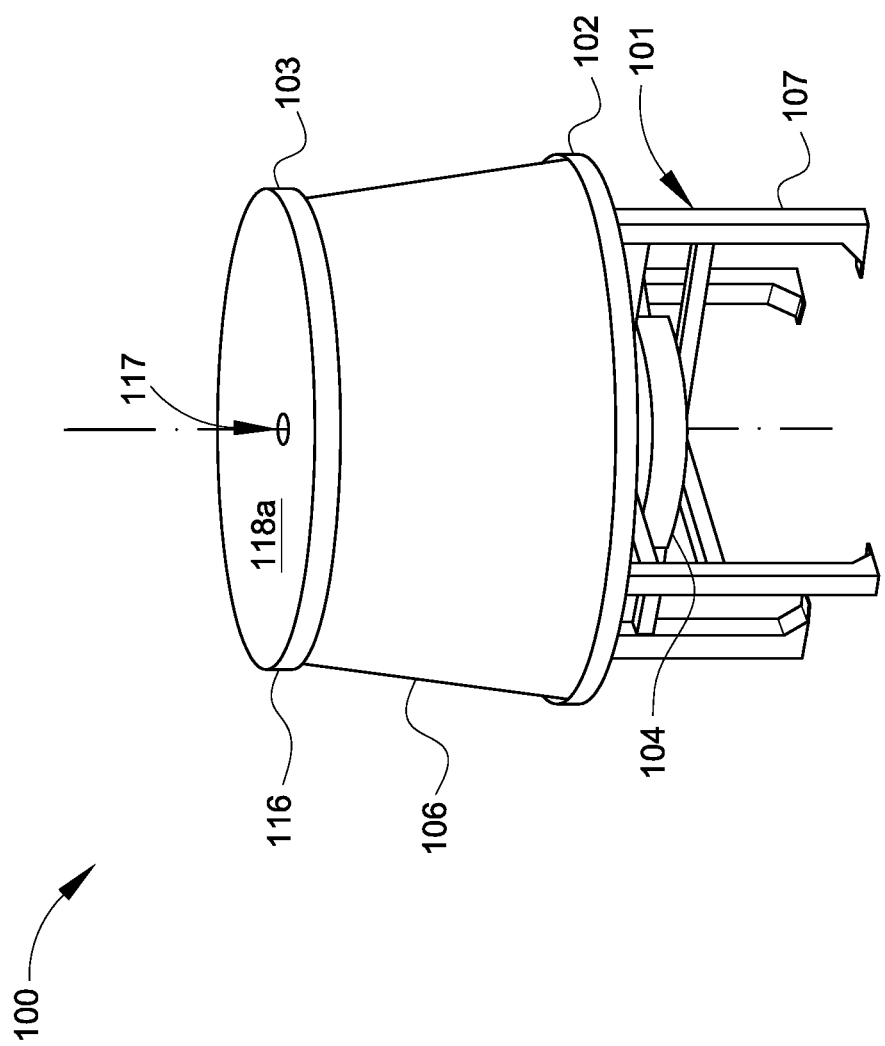
FIG. 1 exemplarily illustrates a perspective view of a mist collection arrangement.
Figure 2:
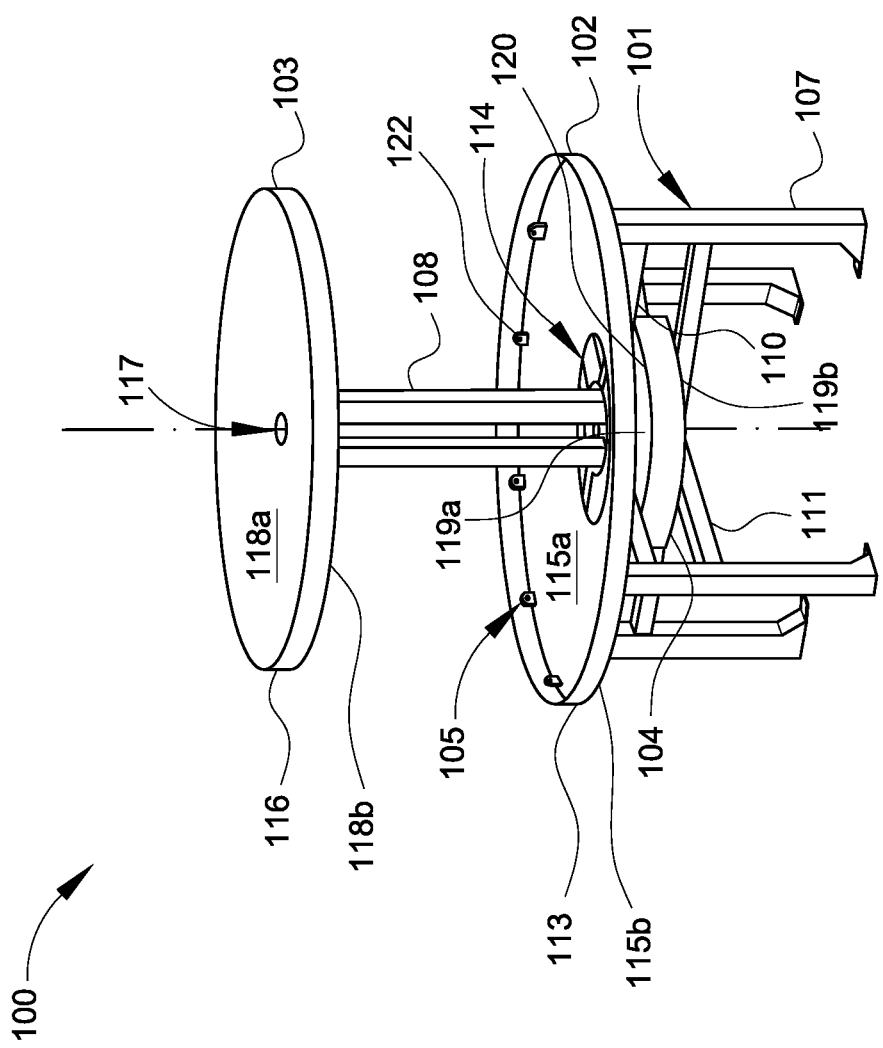
FIG. 2 exemplarily illustrates a perspective view of the mist collection arrangement, while a mesh member is uninstalled from the mist collection arrangement.
Figure 3:
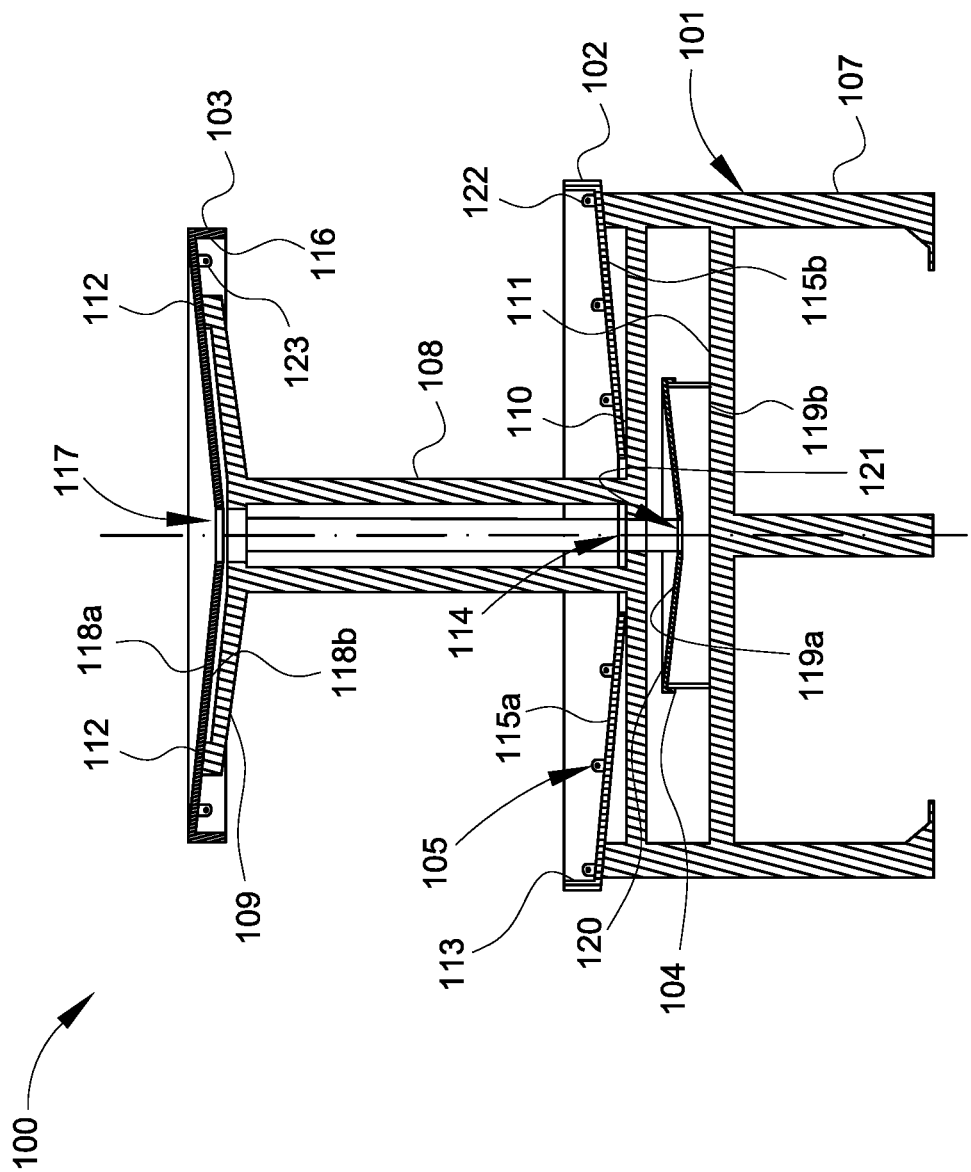
FIG. 3 exemplarily illustrates a sectional view of the mist collection arrangement.

Referring to FIGS. 1, 2, and 3, the mist collection arrangement 100 is disclosed. The mist collection arrangement 100 includes a support frame 101, a first funnel disk 102, a second funnel disk 103, a cylindrical storage tank 104, a mesh mounting arrangement 105, and a mesh member 106. For clarity purposes, one or more components of the mist collection arrangement 100 are not shown in one or more FIGS. For example, the mesh member 106 of the mist collection arrangement 100, is not shown in FIGS. 2 and 3.

The support frame 101 is suitably structured and arranged to support one or more members of the mist collection arrangement 100. Particularly, the mist collection arrangement 100 supports the first funnel disk 102, the second funnel disk 103, and the cylindrical storage tank 104 of the mist collection arrangement 100. The mesh mounting arrangement 105 is provided to mount and support the mesh member 106 on the mist collection apparatus 100. In an exemplary embodiment, the mesh member 106 is a mesh structure made up of hydrophilic material that captures mist from air. In an embodiment, the support frame 101 includes a base structure 107, at least one vertical post 108 positioned above the base structure 107, and a tripod structure 109 positioned above the vertical posts 108. The tripod structure 109 herein refers to a conventional three armed or four-armed structure, reversely positioned to support a component such as a funnel disk over the arms. The base structure 107 defines a first disk mounting region 110 and a tank mounting region 111. The tripod structure 109 defines a second disk mounting region 112, over the arms of the tripod structure 109. Although, an exemplary embodiment of the support frame 101 is described herein, various other structures of the support frame 101 may also be envisioned to support the first funnel disk 102, the second funnel disk 103, and the cylindrical storage tank 104 of the mist collection arrangement 100.

In accordance with an embodiment, the first funnel disk 102 is made up of metal and/ or alloy material to provide sufficient strength and rigidity to the mist collection arrangement 100. The first funnel disk 102 includes a first periphery 113 and a first drip cavity 114. The first drip cavity 114 is defined along a central region of the first funnel disk 102, such that water collected on a top surface 115a of the first funnel disk 102 is funneled to the first drip cavity 114. In assembly, the first funnel disk 102 is fixedly mounted on the first disk mounting region 110 of the base structure 107 of the support frame 101, such that the vertical posts 108 extend through the first drip cavity 114 of the first funnel disk 102. Moreover, the first disk mounting region 110 is structured such that it allows water trickling through the first drip cavity 114 to pass therethrough. Various mounting arrangements for fixedly mounting of the first funnel disk 102 to the first disk mounting region 110 of the support frame 101 may be envisioned. Such mounting arrangements include, such as but not limited to, a bolt arrangement, a rivet arrangement, a weld arrangement, and/ or an adhesive arrangement.

The second funnel disk 103 is constructed similar to the first funnel disk 102. Particularly, the second funnel disk 103 is made up of metal and/ or alloy material to provide sufficient strength and rigidity to the mist collection arrangement 100. The second funnel disk 103 includes a second periphery 116 and a second drip cavity 117. The second drip cavity 117 is defined along a central region of the second funnel disk 103, such that water collected on a top surface 118a of the second funnel disk 103 is funneled to the second drip cavity 117. For example, rainwater collected on the top surface 118a of the second funnel disk 103 is funneled to the second drip cavity 117 and later allowed to trickle through the second drip cavity 117. Further, a diameter of the second funnel disk 103 is relatively smaller than a diameter of the first funnel disk 102. In assembly, the second funnel disk 103 is fixedly mounted on the second disk mounting region 112 of the tripod structure 109 of the support frame 101. With such arrangement, the second funnel disk 103 is mounted at a relatively greater height than the first funnel disk 102 and is coaxially aligned with the first funnel disk 102. Particularly, the second drip cavity 117 of the second funnel disk 103 is coaxially aligned with the first drip cavity 114 of the first funnel disk 102. In an embodiment, the mist collection arrangement 100 is so structured, such that the second funnel disk 103 is mounted at a height lesser than 45 inches from a base (or ground level) of the base structure 107 of the support frame 101. Various mounting arrangements for fixedly mounting the first funnel disk 102 to the first disk mounting region 110 of the support frame 101 may be envisioned. Such mounting arrangements include, such as but not limited to, a bolt arrangement, a rivet arrangement, a weld arrangement, and/ or an adhesive arrangement.

The cylindrical storage tank 104 includes a top surface 119a and a bottom surface 119b. The top surface 119a of the cylindrical storage tank 104 is formed in form of a third funnel disk 120 including a third drip cavity 121. The third funnel disk 120 is suitably structured to funnel water collected on the top surface 119a to the third drip cavity 121. Particularly, water collected on the top surface 119a of the cylindrical storage tank 104 trickles downwards to an interior of the cylindrical storage tank 104, through the third drip cavity 121. Further, the cylindrical storage tank 104 is fixedly mounted on the tank mounting region 111 of the base structure 107 of the support frame 101. With such an arrangement, the cylindrical storage tank 104 is mounted at a relatively lesser height than the first funnel disk 102 and is coaxially aligned with the first funnel disk 102. Particularly, the third funnel disk 120 of the cylindrical storage tank 104 is coaxially aligned with the first funnel disk 102, such that the third drip cavity 121 is coaxially aligned with the first drip cavity 114. Various mounting arrangements for fixedly mounting the cylindrical storage tank 104 to the tank mounting region 111 of the support frame 101 may be envisioned. Such mounting arrangements include, such as but not limited to, a bolt arrangement, a rivet arrangement, a weld arrangement, and/ or an adhesive arrangement.

The mesh mounting arrangement 105 is provided to mount and support the mesh member 106 on the mist collection apparatus 100. The mesh mounting arrangement 105 includes a first array of hooks 122 and a second array of hooks 123. The first array of hooks 122 are arranged along the first periphery 113 and are fixed to the top surface 115a of the first funnel disk 102. With such an arrangement, the first array of hooks 122 are positioned within the first periphery 113, at an offset distance from the first periphery 113 of the first funnel disk 102. The second array of hooks 123 are arranged along the second periphery 116 and are fixed to a bottom surface 118b of the second funnel disk 103. With such an arrangement, the second array of hooks 123 are positioned within the second periphery 116, at an offset distance from the second periphery 116 of the second funnel disk 103. Although, the mesh mounting arrangement 105 is described as a combination of the first array of hooks 122 and the second array of hooks 123, various other types of the mesh mounting arrangement 105 may be contemplated. Examples of the mesh mounting arrangement 105 includes, such as but not limited to, a set of cable ties, a set of nails, an eye-pole flange type arrangement, and the like.

The mesh member 106 is a mesh structure made up of hydrophobic material that captures water from mist in air flowing therethrough. Particularly, the hydrophobic material of the mesh member 106 has a property to attract water thereby facilitating collection and deposition of water from mist on the mesh member 106 as air flows through the mesh member 106. Examples of the hydrophobic material includes, such as but not limited to, polypropylene (PP), polyethylene, any combination of polymeric material, and the like. Further, the mesh member 106 is attached to and extends between the first periphery 113 and the second periphery 116, to form a frustoconical structure. Particularly, the mesh member 106 is attached to each of the first array of hooks 122 and each of the second array of hooks 123, such that the mesh member 106 is draped between the first periphery 113 and the second periphery 116. With such an arrangement, the mesh member 106 forms the frustoconical structure, within the first periphery 113 and the second periphery 116. As air flows through the mesh member 106, water from the mist is collected and deposited on the mesh member 106, which is trickled to the first funnel disk 102 and further to the cylindrical storage tank 104. Although, the mesh member 106 is described to be formed of hydrophobic material, various other materials for the mesh member 106 may be contemplated, such as but not limited to, bamboo, metallic wires, alloy materials, polymer mesh, wooden mesh, and the like. Moreover, although the mesh member 106 is disclosed to be formed of hydrophobic material, hydrophilic material, or a suitable combination of hydrophilic material and hydrophobic material may also be contemplated, to capture water from mist in air flowing therethrough.

Figure 4:
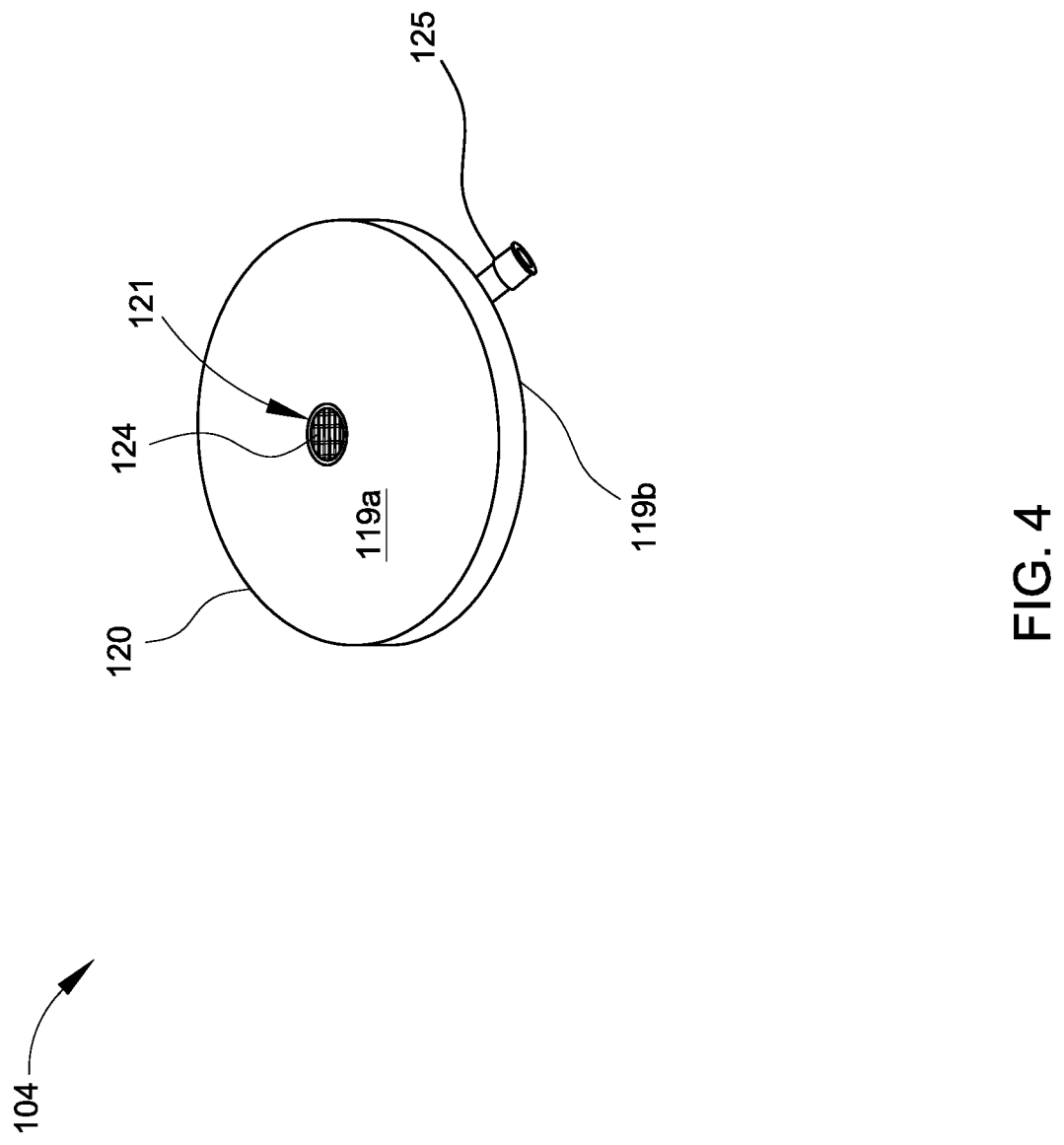
FIG. 4 exemplarily illustrates a perspective view of a cylindrical storage tank of the mist collection arrangement.

Referring to FIG. 4, a perspective view of the cylindrical storage tank 104 is shown. The top surface 119a of the cylindrical storage tank 104 includes an inlet port 121 of the cylindrical storage tank 104. It may be noted that the inlet port 121 is same as the third drip cavity 121 of the third funnel disk 120. The inlet port 121 holds a strainer member 124 that prevents entry of waste particles into the cylindrical storage tank 104.

Figure 5:
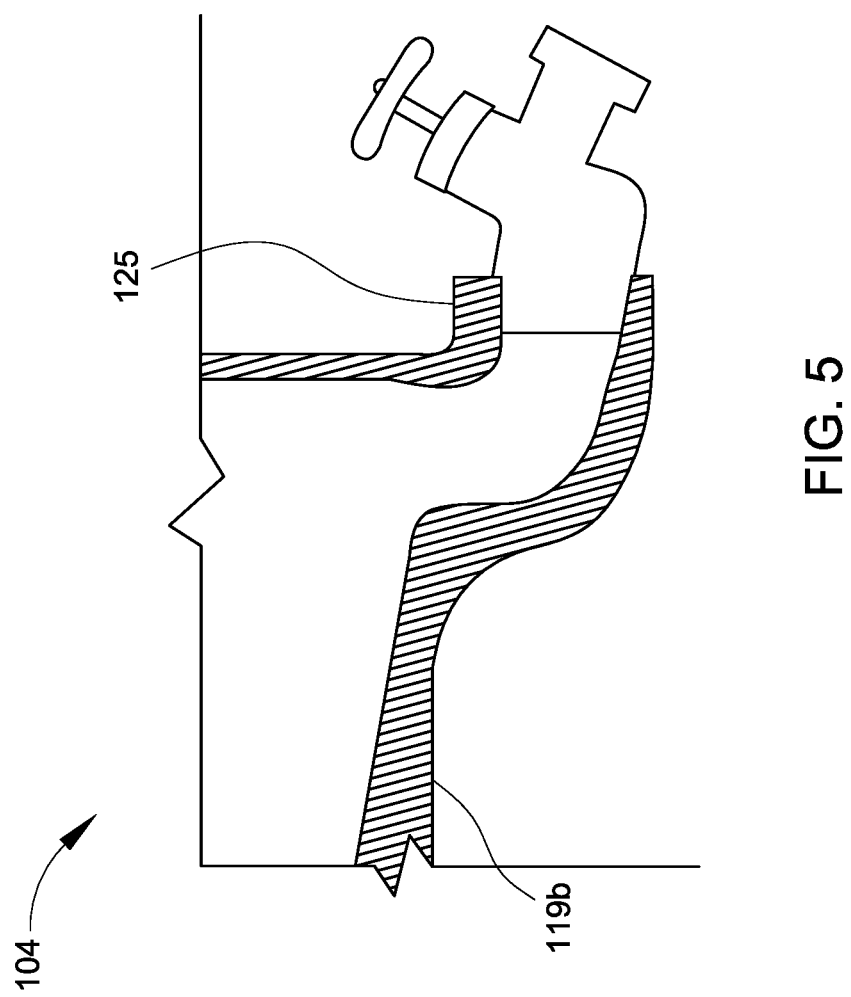
FIG. 5 exemplarily illustrates a sectional view of a portion of the cylindrical storage tank of FIG. 4, illustrating an outlet port of the cylindrical storage tank.

Referring to FIG. 5, a sectional view of a portion of the cylindrical storage tank 104 is shown. The bottom surface 119b of the cylindrical storage tank 104 includes an outlet port 125 formed in a spigot type arrangement. Particularly, the outlet port 125 is formed, such that a portion of the outlet port 125 extends beyond the bottom surface 119b of the cylindrical storage tank 104, such that a relatively easy drain of water from the cylindrical storage tank 104 is facilitated when required. Also a suitable slope can be designed within the storage tank 104 to maximize drain of water through the outlet port 125. Further, a valve or a faucet to remove water from the outlet port may be optionally provided to drain water through the outlet port 125, when required.

Figure 6:
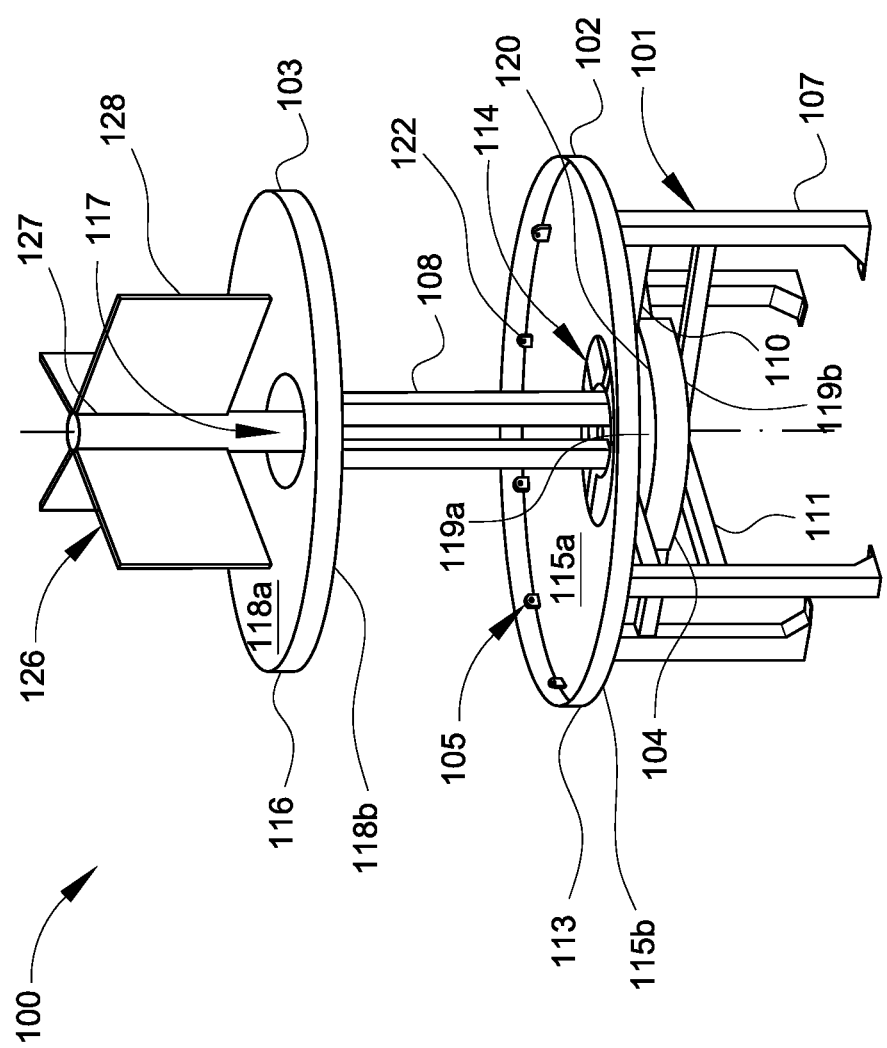
FIG. 6 exemplarily illustrates a perspective view of an alternate embodiment of the mist collection arrangement, employing a bird deterring arrangement.

Referring to FIG. 6, there is shown an alternate embodiment of the mist collection arrangement 100. In this embodiment, the mist collection arrangement 100 employs a bird deterring arrangement 126 in addition to other components of the mist collection arrangement 100. The bird deterring arrangement 126 could include one of a wind-vane type arrangement or an oscillatory ball arrangement. A wind-vane type arrangement of the bird deterring arrangement 126 is shown and described in FIG. 6. In such an arrangement, the bird deterring arrangement 126 includes a vertical rotatable pillar 127 and a number of wind vanes 128 attached to the vertical rotatable pillar 127. The wind vanes 128 rotate as air flows therethrough, which keeps birds away from the mist collection arrangement 100. In such embodiments, a distance between a top of the vertical rotatable pillar 127 and a base (or ground level) of the base structure 107 of the support frame 101 is relatively lesser than 45 inches, such that an overall height of the mist collection arrangement 100 is less than 45 inches. In an alternate embodiment, reflective ribbons are tied on the pillar 127 to create shimmers from the sun to scare birds.

Referring to FIGS. 1-6, in assembly, the first funnel disk 102 is mounted in the first disk mounting region 110, the second funnel disk 103 is mounted on the second disk mounting region 112, and the cylindrical storage tank 104 mounted on the tank mounting region 111 of the support frame 101. The first funnel disk 102, the second funnel disk 103 and the cylindrical storage tank 104 are mounted, such that the first drip cavity 114, the second drip cavity 117, and the third drip cavity 121 (or the inlet port 121) are coaxially aligned with each other. Furthermore, the mesh member 106 is draped between the first periphery 113 and the second periphery 116. Particularly, the mesh member 106 is attached to the first array of hooks 122 and the second array of hooks 123, such that the mesh member 106 forms a frustoconical structure. As the second funnel disk 103 is positioned at a height lesser than 45 inches, an overall height of the mist collection arrangement 100 remains lesser than 45 inches. Accordingly, the mist collection arrangement 100 is not visible over generally employed fences with a height of 48 inches used in fields of the drip irrigation system. Particularly, such compact mist collection arrangements 100 facilitate a relatively improved visibility of areas of operation to outside environment.

In operation, as air flows through the mesh member 106, mist is collected on the mesh member 106. As the mesh member 106 is made of frustoconical structure, a relatively greater area is exposed to surrounding air that causes relatively greater mist collection on the mesh member 106. Water so collected on the mesh member 106 is trickled to the top surface 115a of the first funnel disk 102. As the mesh member 106 is positioned within the first periphery 113 and the second periphery 116, entire water is trickled to the top surface 115a of the first funnel disk 102, and water spillage is avoided. From the top surface 115a of the first funnel disk 102, water is funneled and trickled to the top surface 119a of the cylindrical storage tank 104 through the first drip cavity 114. From the top surface 119a of the cylindrical storage tank 104, water is funneled and trickled to the interior of the cylindrical storage tank 104, through the strainer member 124 in the inlet port of the cylindrical storage tank 104.

Furthermore, rainwater is collected on the top surface 118a of the second funnel disk 103. Water so collected is funneled to the second drip cavity 117, through which water trickles downwards to the top surface 119a of the cylindrical storage tank 104. From the top surface 119a of the cylindrical storage tank 104, water is funneled and trickled to the interior of the cylindrical storage tank 104, through the strainer member 124 in the inlet port 121 of the cylindrical storage tank 104. Water so collected in the cylindrical storage tank 104 is used for varied purposes, such as drip irrigation purposes.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein but can be employed in any number of applications and equivalent devices by those of ordinary skill in the art. Rather it is hereby intended the scope be defined by the claims appended hereto. Additionally, the features of various implementing embodiments may be combined to form further embodiments of the invention.

What is claimed is:

1. A mist collection arrangement, comprising:
   a support frame;
   a first funnel disk mounted on the support frame, the first funnel disk including a first periphery and a first drip cavity;
   a second funnel disk mounted on the support frame at a relatively greater height than the first funnel disk and coaxially aligned with the first funnel disk, the second funnel disk including a second periphery and a second drip cavity, the second funnel disk having a diameter relatively smaller than a diameter of the first funnel disk;
   a third funnel disk mounted on the support frame at a relatively lesser height than the first funnel disk and coaxially aligned with the first funnel disk, the third funnel disk including a third drip cavity; and
   a mesh member attached to and extending between the first periphery and the second periphery, to form a substantially frustoconical structure,
   wherein the mist collection arrangement is structured such that water collected on the first funnel disk is trickled to the third drip cavity of the third funnel disk through the first drip cavity and water collected on the second funnel disk is trickled to the third drip cavity of the third funnel disk through the second drip cavity.

2. The mist collection arrangement according to claim 1, wherein the mist collection arrangement includes a cylindrical storage tank integrally formed with the third funnel disk, such that the third funnel disk forms a top surface of the cylindrical storage tank.

3. The mist collection arrangement according to claim 2, wherein the cylindrical storage tank includes an inlet port and an outlet port, the inlet port is defined in the top surface and holds a strainer member, the outlet port is defined in a bottom surface and is formed in form of a spigot arrangement.

4. The mist collection arrangement according to claim 1, further comprising a mesh mounting arrangement, including:
   a first array of hooks arranged along and positioned inside the first periphery of the first funnel disk; and
   a second array of hooks arranged along and positioned inside the second periphery of the second funnel disk,
   wherein the mesh member is attached to each of the first array of hooks and the second array of hooks, in order to form the frustoconical structure.

5. The mist collection arrangement according to claim 1, wherein the mesh member is formed of a hydrophilic material and is capable of collecting mist from air flowing therethrough.

6. The mist collection arrangement according to claim 1, wherein the second funnel disk is positioned at a height relatively lesser than 45 inches from a base of the support frame.

7. A mist collection arrangement, comprising:
   a support frame;
   a first funnel disk mounted on the support frame, the first funnel disk including a first periphery and a first drip cavity;
   a second funnel disk mounted on the support frame at a relatively greater height than the first funnel disk and coaxially aligned with the first funnel disk, the second funnel disk including a second periphery and a second drip cavity, the second funnel disk having a diameter relatively smaller than a diameter of the first funnel disk;

a cylindrical storage tank mounted on the support frame at a relatively lesser height than the first funnel disk and coaxially aligned with the first funnel disk, the cylindrical storage tank including a top surface and a bottom surface, the top surface being made in form of a third funnel disk and including an inlet port, the bottom surface including an outlet port; and a mesh member attached to and extending between the first periphery and the second periphery, to form a frustoconical structure, wherein the mist collection arrangement is structured such that water collected on the first funnel disk is trickled to the inlet port of the cylindrical storage tank through the first drip cavity and water collected on the second funnel disk is trickled to the inlet port of the cylindrical storage tank through the second drip cavity.

8. The mist collection arrangement according to claim 7, wherein the inlet port of the cylindrical storage tank holds a strainer member, the outlet port being formed in form of a spigot arrangement.

9. The mist collection arrangement according to claim 7, further comprising a mesh mounting arrangement, the mesh mounting arrangement including:

a first array of hooks arranged along and positioned inside the first periphery of the first funnel disk; and a second array of hooks arranged along and positioned inside the second periphery of the second funnel disk, wherein the mesh member is attached to each of the first array of hooks and the second array of hooks, in order to form the frustoconical structure.

10. The mist collection arrangement according to claim 7, wherein the mesh member is formed of a hydrophilic material and is capable of collecting mist from air flowing therethrough.

11. The mist collection arrangement according to claim 7, wherein the second funnel disk is positioned at a height lesser than 45 inches from a base of the support frame.

12. A mist collection arrangement, comprising:

a support frame;

a first funnel disk mounted on the support frame, the first funnel disk including a first periphery and a first drip cavity;

a second funnel disk mounted on the support frame at a relatively greater height than the first funnel disk and coaxially aligned with the first funnel disk, the second funnel disk including a second periphery and a second drip cavity;

a cylindrical storage tank mounted on the support frame at a relatively lesser height than the first funnel disk and coaxially aligned with the first funnel disk, the cylindrical storage tank including a top surface and a bottom surface, the top surface being made of a third funnel disk and defining an inlet port, the bottom surface defining an outlet port;

a mesh mounting arrangement, including:

a first array of hooks arranged along and positioned inside the first periphery of the first funnel disk; and a second array of hooks arranged along and positioned inside the second periphery of the second collection tank; and a mesh member being attached to each of the first array of hooks and the second array of hooks, to extend between the first periphery and the second periphery.

13. The mist collection arrangement according to claim 12, wherein the inlet port of the cylindrical storage tank holds a strainer member, the outlet port is formed in form of a spigot member.

14. The mist collection arrangement according to claim 12, wherein the mesh member is formed of a hydrophilic material and is capable of collecting mist from air flowing therethrough.

15. The mist collection arrangement according to claim 12, wherein the first funnel disk, the second funnel disk, and the mesh member are arranged such that water collected on the first funnel disk is trickled to the cylindrical storage tank through the first drip cavity and water collected on the second funnel disk is trickled to the cylindrical storage tank through the second drip cavity.

16. The mist collection arrangement according to claim 12, wherein the second funnel disk is positioned at a height lesser than 45 inches from a base of the support frame.

* * * * *